(12) United States Patent
Bauer et al.

(10) Patent No.: US 9,328,236 B2
(45) Date of Patent: May 3, 2016

(54) POLYSILOXANE MODIFIED RESOL RESIN, MOULDED BODIES AND COMPOSITES OBTAINED THEREFROM AND METHODS FOR PRODUCING THE RESIN, THE MOULDED BODIES AND THE COMPOSITES

(75) Inventors: Monika Bauer, Koenigs-Wusterhausen (DE); Hans-Juergen Glasel, Leipzig (DE); Daniel Decker, Liederbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 36 days.

(21) Appl. No.: 14/131,773

(22) PCT Filed: Jul. 5, 2012

(86) PCT No.: PCT/EP2012/063143
§ 371 (c)(1),
(2), (4) Date: May 27, 2014

(87) PCT Pub. No.: WO2013/007600
PCT Pub. Date: Jan. 17, 2013

(65) Prior Publication Data
US 2014/0275373 A1 Sep. 18, 2014

(30) Foreign Application Priority Data

Jul. 12, 2011 (DE) .................. 10 2011 051 773

(51) Int. Cl.
| | | |
|---|---|---|
| *C08L 83/04* | (2006.01) | |
| *C08L 61/06* | (2006.01) | |
| *C08L 61/14* | (2006.01) | |
| *C08G 77/60* | (2006.01) | |
| *C08G 77/42* | (2006.01) | |
| *C08L 83/14* | (2006.01) | |
| *C08L 83/10* | (2006.01) | |
| *C08G 77/62* | (2006.01) | |
| *C08K 7/04* | (2006.01) | |

(52) U.S. Cl.
CPC ................ *C08L 61/06* (2013.01); *C08G 77/42* (2013.01); *C08G 77/60* (2013.01); *C08L 61/14* (2013.01); *C08L 83/10* (2013.01); *C08L 83/14* (2013.01); *C08G 77/62* (2013.01); *C08K 7/04* (2013.01); *C08L 2205/16* (2013.01)

(58) Field of Classification Search
CPC ......... C07F 7/18; C08K 5/5419; C08L 61/06; C08G 77/62
USPC .............................................. 525/474
See application file for complete search history.

(56) References Cited

U.S. PATENT DOCUMENTS

| | | | |
|---|---|---|---|
| 3,053,807 A * | 9/1962 | Lederman et al. ............... 526/71 |
| 3,911,045 A | 10/1975 | Hartmann et al. | |
| 4,670,057 A | 6/1987 | Oezelli et al. | |
| 5,063,134 A | 11/1991 | Horiguchi et al. | |
| 5,177,157 A | 1/1993 | Akamatsu | |
| 5,736,619 A * | 4/1998 | Kane et al. ..................... 525/393 |
| 2012/0082850 A1 | 4/2012 | Bauer et al. | |

FOREIGN PATENT DOCUMENTS

| | | |
|---|---|---|
| WO | WO9633238 | 10/1996 |
| WO | WO0162829 A1 | 8/2001 |
| WO | WO 2010/142769 A1 | 12/2010 |

OTHER PUBLICATIONS

European Patent Office, International Search Report, PCT/EP2012/063143, dated Dec. 14, 2012.

\* cited by examiner

*Primary Examiner* — Kuo-Liang Peng
(74) *Attorney, Agent, or Firm* — Duane Morris LLP

(57) ABSTRACT

The present invention relates to a resol resin consisting of at least one aromatic component with a phenolic OH group and at least one aldehyde component, wherein areas embedded in the resol resin matrix consisting of organically-modified polysiloxane, with said polysiloxane containing hydrocarbon groups that are at least partially bonded to said silicon in the form of non-substituted or substituted alkyl, alkenyl, aryl, arylalkyl or alkyl-aryl groups and that are not linked by covalent bonds to reactive groups of said resol resin. The invention additionally relates to molded articles manufactured from said resin, composites from a sheet material impregnated with said resin, which was subsequently hardened, as well as methods for manufacturing said resin, said molded articles, and said composites.

17 Claims, 8 Drawing Sheets

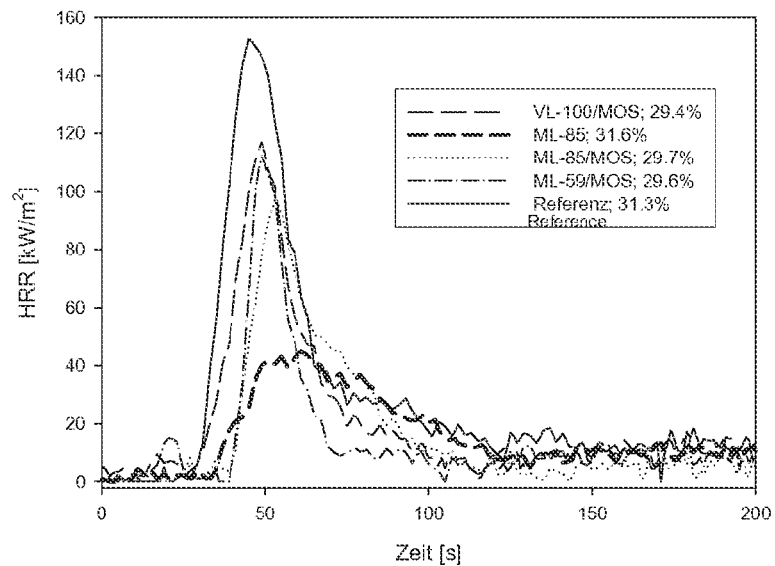
Fig. 1  Maximum heat release rates HRR of polysiloxane composite laminates compared to unmodified phenolic resin reference
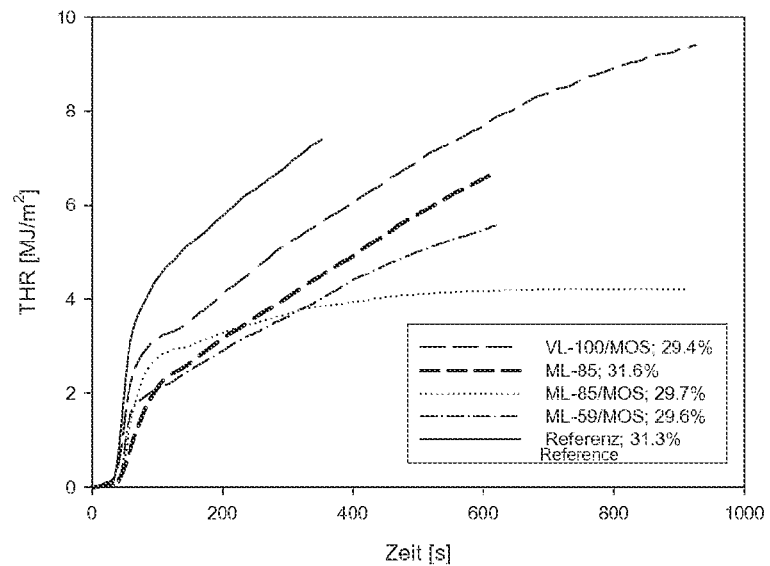
Fig. 2  Total heat release rate THR of polysiloxane composite laminates compared to the unmodified phenolic resin reference

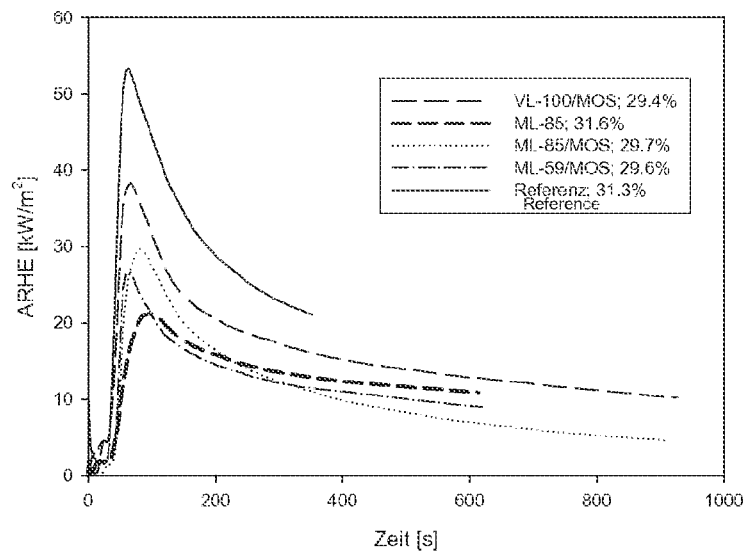
Fig. 3  Average heat release rate ARHE of polysiloxane composite laminates compared to the unmodified phenolic resin reference
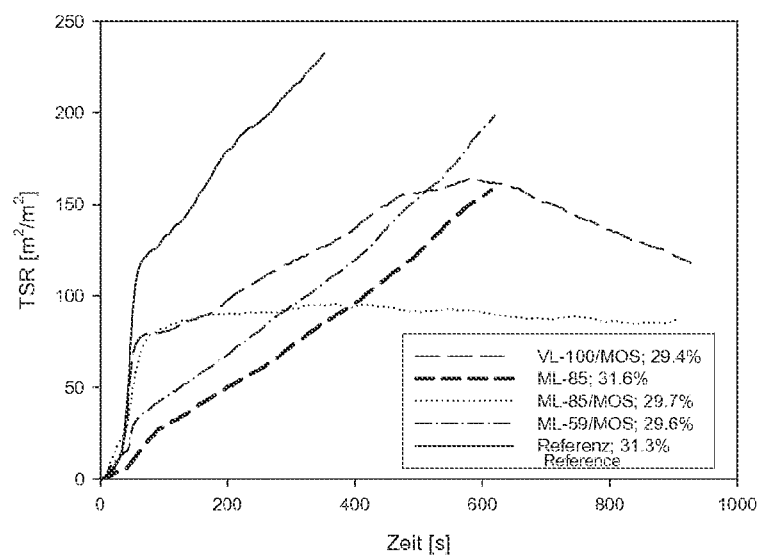
Fig. 4  Overall smoke development of polysiloxane composite laminates compared to the unmodified phenolic resin reference

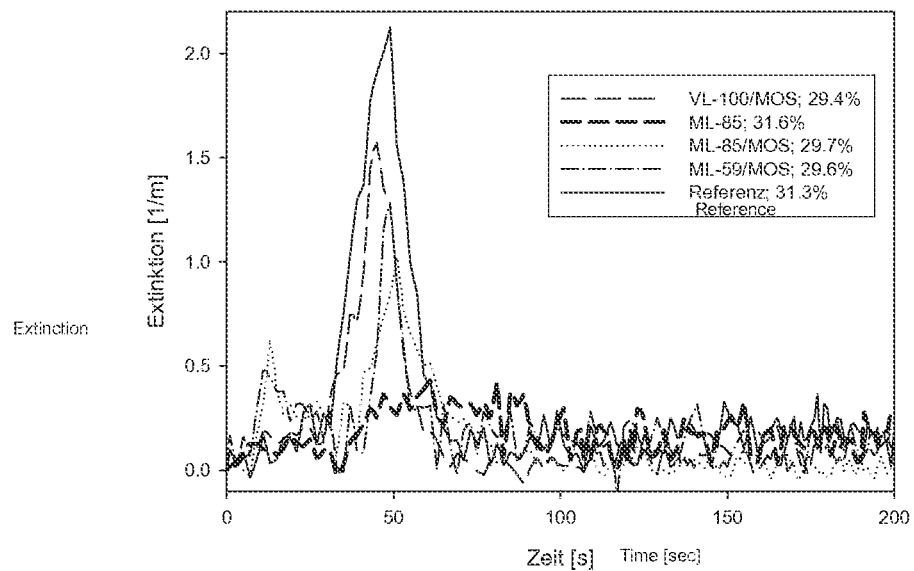
Fig. 5 Smoke-caused modification of the extinction of polysiloxane composite laminates compared to the unmodified phenolic resin reference
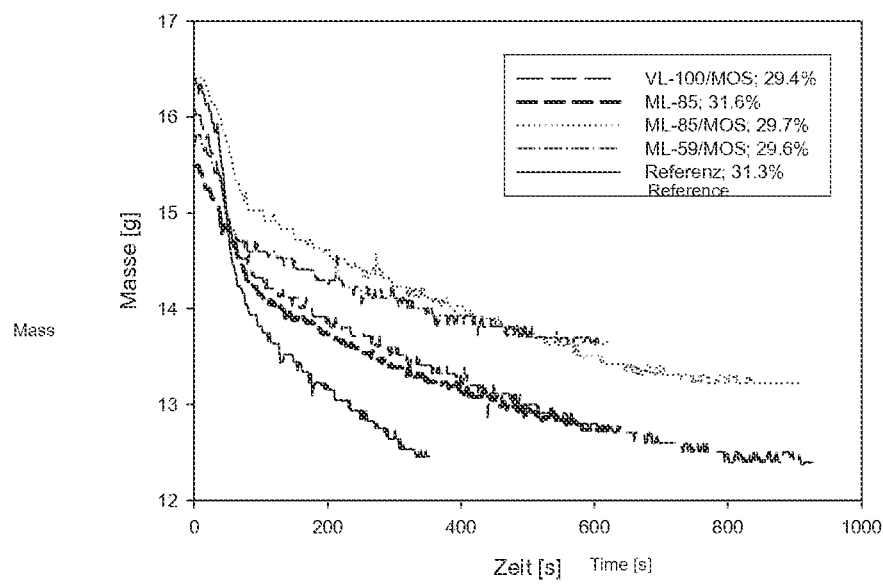
Fig. 6 Losses of mass of polysiloxane composite laminates compared to the unmodified phenolic resin reference

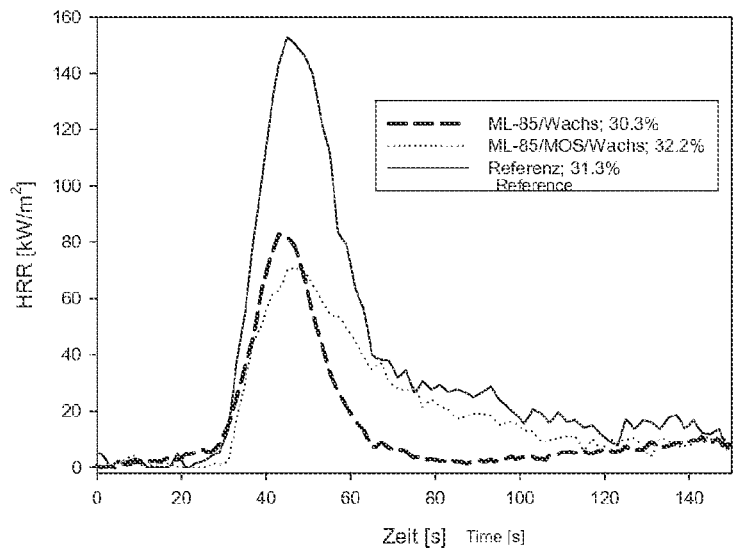
Fig. 7   Influence of the polysiloxane modifications ML-85/wax OH 350-D and ML-85/MOS/wax OH 350-D on the maximum heat release rate HHR
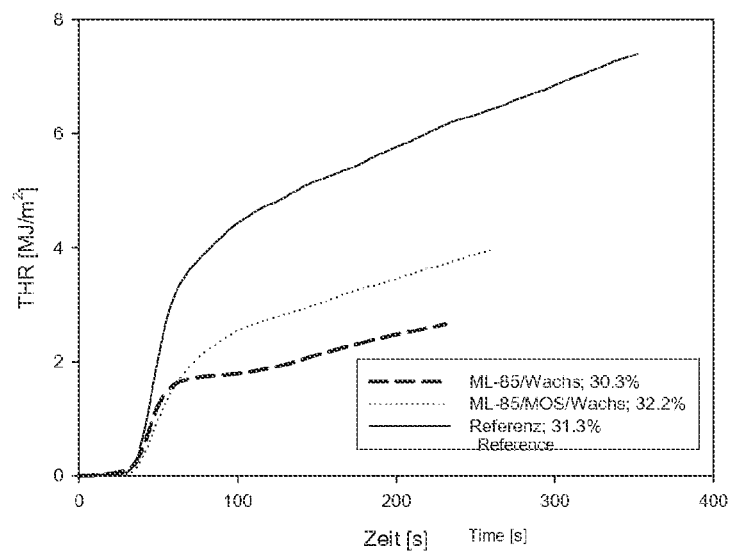
Fig. 8   Influence of the polysiloxane modifications ML-85/wax OH 350-D and ML-85/MOS/wax OH 350-D on the total heat release rate THR

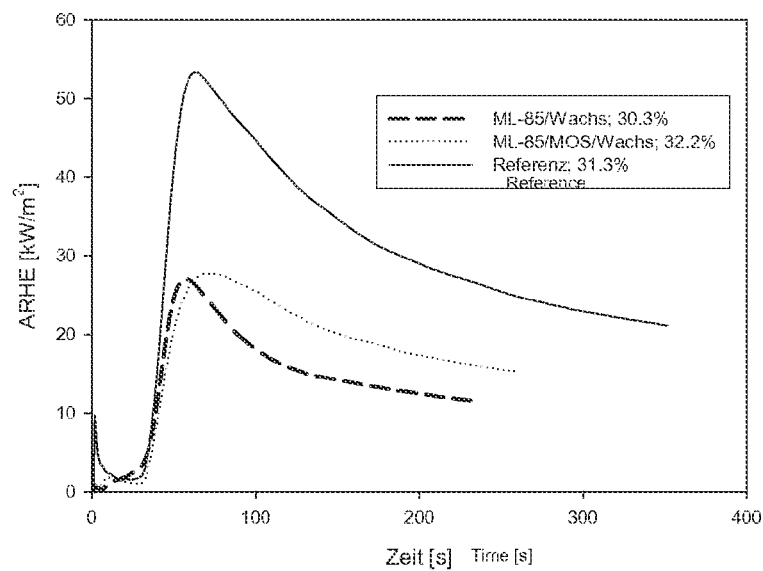
Fig. 9 Influence of combined polysiloxane modifications ML-85/wax OH 350-D and ML-85/MOS/wax OH 350-D on average heat release rate ARHE
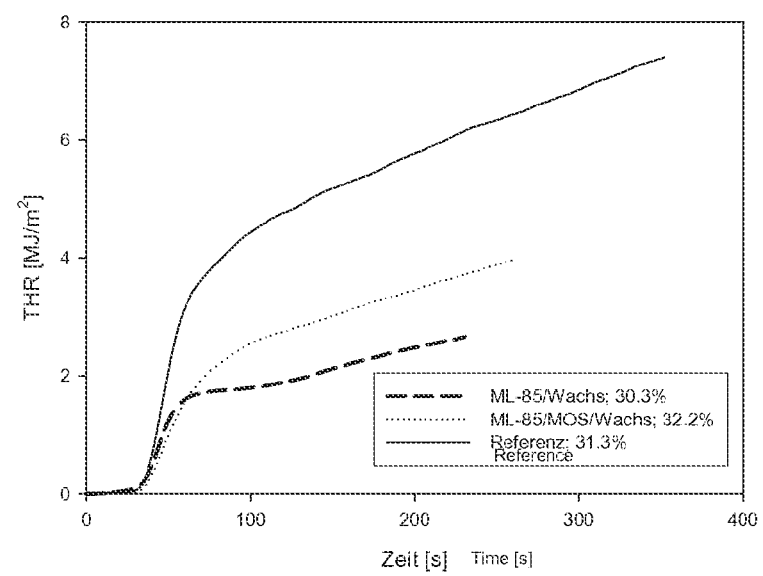
Fig. 10 Influence of combined polysiloxane modifications ML-85/wax OH 350-D and ML-85/MOS/wax OH 350-D on the overall heat release rate THR

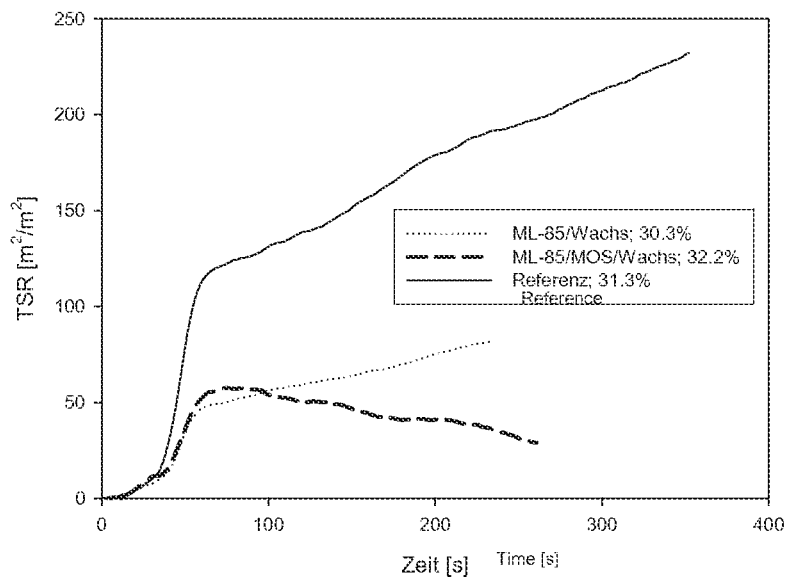
Fig. 11  Influence of combined polysiloxane modifications ML-85/wax OH 350-D and ML-85/MOS/wax OH 350-D on the overall development of smoke TSR
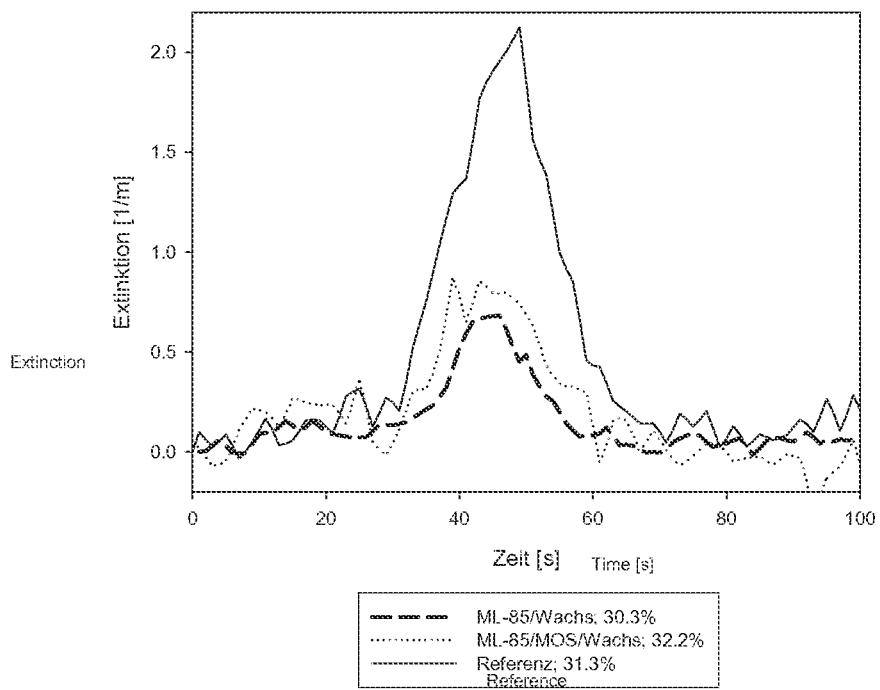
Fig. 12  Influence of the combined polysiloxane-modification ML-85/wax OH 350-D and ML-85/MOS/wax OH 350-D on the modification of extinction caused by smoke

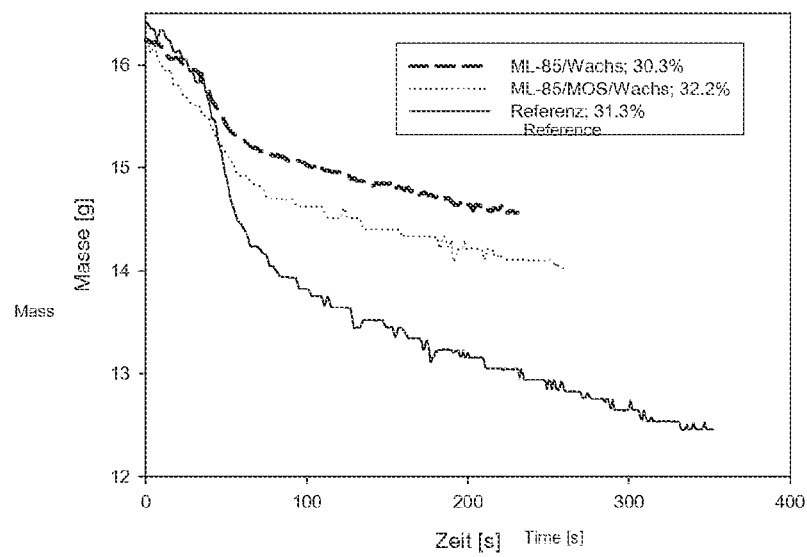
Fig. 13 Influence of the combined polysiloxane-modification ML-85/wax OH 350-D and ML-85/MOS/wax OH 350-D on the loss of mass
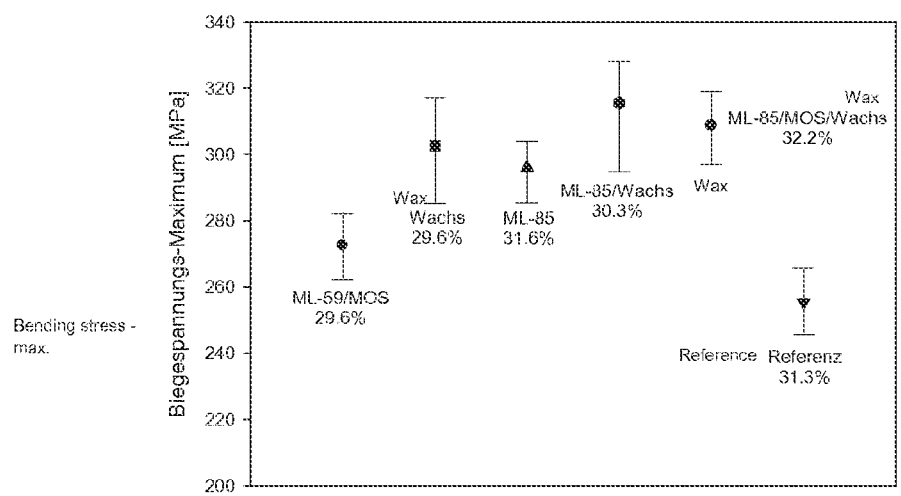
Fig. 14 Maximum bending stress (in the y-direction) upon breaking the test piece of polysiloxane/phenolic resin fiberglass composites compared to the unmodified phenolic resin reference

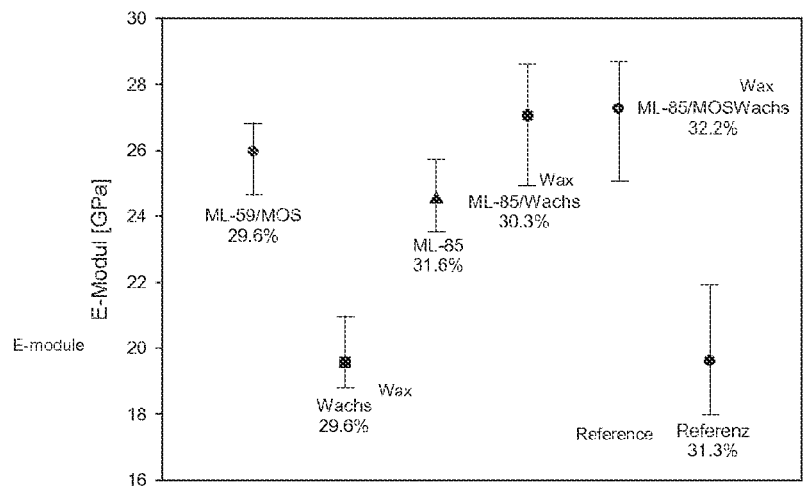
Fig. 15 Flexural modulus of polysiloxane/phenolic resin fiberglass composites compared to an unmodified phenolic resin reference
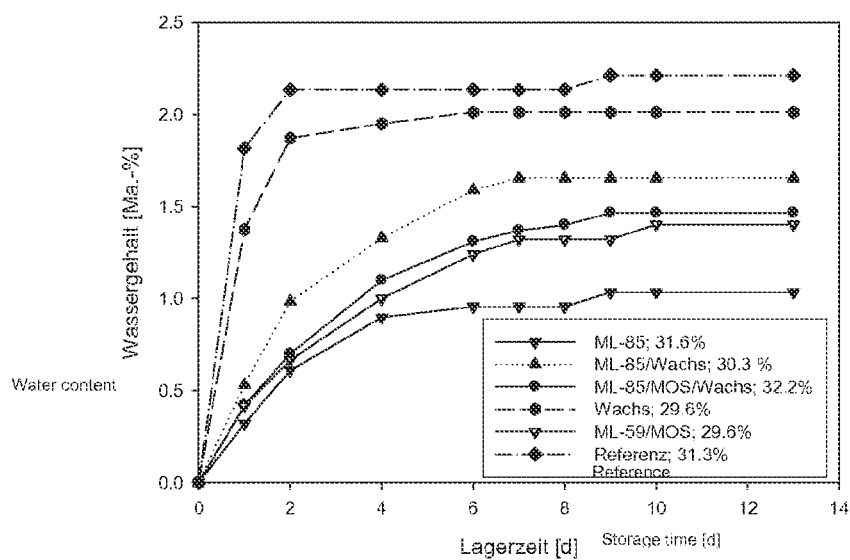
Fig. 16 Water absorption at room temperature (arithmetic average from 2 determinations) of polysiloxane/phenolic resin fiberglass composites compared to an unmodified phenolic resin reference

POLYSILOXANE MODIFIED RESOL RESIN, MOULDED BODIES AND COMPOSITES OBTAINED THEREFROM AND METHODS FOR PRODUCING THE RESIN, THE MOULDED BODIES AND THE COMPOSITES The present invention relates to a resol-type phenolic resin ("resol resin") as well as moulded articles and composites thereof containing organically functionalized polysiloxanes. These polysiloxanes significantly influence relevant physical parameters of such moulded article and composite materials or their precursors (said resoles).

Polysiloxane-modified resol-type phenolic resins are known. WO 01/062 829 describes a multi-hour reaction of epoxy-functionalized polysiloxanes with mono or multifunctional phenols at relatively high temperatures and the subsequent mixing of a polysiloxane-modified polyphenol with resol resins. In the process, said polysiloxanes can be covalently incorporated into said resol resin by means of the epoxy groups. Through a subsequent impregnation, composites can be obtained with glass powder, glass fabric, paper, carbon fibers, and aramid. Compared to the complementary methoxy-modified systems, said resol resin composite laminates with epoxy-functionalized polysiloxanes demonstrate increased residual interlaminar shear strength after storage for several months in boiling water.

Commercially available epoxy-modified silicones contain relatively high organic shares, wherefore the fire resistance of said resins, moulded articles, or composites manufactured therewith is generally not improved or only slightly improved. Moreover, the production of epoxy-modified silicon requires several steps. Two additional steps are necessary for the production of resol resins. Thus, the method in WO 01/062 829 is complicated and expensive.

Furthermore, polysiloxane nanoparticles are known. They can be prepared, for example, via the Stöber method. They are popular because they can be produced in relatively small units (one example is the powder commercially available under the name, Aerosil®) and, thus, have large surfaces. Therefore, they can be advantageously used in many applications, especially as fillers.

Polysiloxane fine powders are described in WO 2010/142769 A1, which are obtained through hydrolysis/condensation reactions of organofunctional polysilazanes and/or alkoxysilanes under strongly alkaline conditions. They are also distinguished by a very small primary particle size, a high specific surface, and a large pore volume. Their dispersion in cyanate resins and their thermal hardening results in polymer nanocomposites with a significant increase of the storage module and the glass transition temperature, improved flame resistance, and decreased water absorption compared to unmodified cyanate resin polymer.

The object of the present invention is to provide a macroscopically homogeneous siloxane-modified resol resin, from which moulded articles and composites with good flame resistance and flexural strength as well as very low water absorption can be manufactured, and which can be produced under mild conditions and without raw materials that are costly to manufacture.

Surprisingly, resol resin of this kind can be made available by allowing a condensation reaction of organically modified silanes and/or silazanes with formation of Si—O—Si bonds as well as a condensation between an aromatic alcohol and an aldehyde with formation of said resol resin to occur in a single-stage reaction mixture in situ, preferably simultaneously or nearly simultaneously. In the process, a product develops, in which chains, rings or three-dimensional areas (islands) comprised of organically-modified polysiloxane are uniformly embedded in a resol resin matrix without them being incorporated into the matrix via covalent bonds. This product is considered to be inhomogeneous at the molecular level, although macroscopically it acts completely homogenous due to the small dimensions of the embedded structures. It can be present in a suitable solvent as a clear solution.

According to the invention, "aromatic alcohols" are alcohols having at least one ("phenolic") hydroxy group attached to an aromatic ring, for example, optionally substituted phenols, but may also include compounds having a hydroxy group attached to a fused ring system. Additional hydroxy groups likewise bonded to an aromatic compound or non-aromatic hydroxy groups may be present.

Like any common resol resin, said resol resin can be thermally hardened. Duromere moulded articles, for example, can be obtained in this manner. In the form of a solution, it can be used for impregnation, e.g. of glass fibers. In the process, composites can be obtained through thermal hardening, the thermal and mechanical properties of which are significantly improved compared to unmodified phenolic resin/fiber composite material.

BRIEF DESCRIPTION OF THE DRAWINGS

FIG. 1 shows the maximum heat release rates HRR of polysiloxane composite laminates compared to the unmodified phenolic resin reference.

FIG. 2 shows the total heat release rate THR of polysiloxane composite laminates compared to the unmodified phenolic resin reference.

FIG. 3 shows the average heat release rate ARHE of polysiloxane composite laminates compared to the unmodified phenolic resin reference.

FIG. 4 shows the overall smoke development of polysiloxane composite laminates compared to the unmodified phenolic resin reference.

FIG. 5 shows the smoke-caused modification of the extinction of polysiloxane composite laminates compared to the unmodified phenolic resin reference.

FIG. 6 shows the losses of mass of polysiloxane composite laminates compared to the unmodified phenolic resin reference.

FIG. 7 shows the influence of the polysiloxane modifications ML-85/wax OH 350-D and ML-85/MOS/wax OH 350-D on the maximum heat release rate HHR.

FIG. 8 shows the influence of the polysiloxane modifications ML-85/wax OH 350-D and ML-85/MOS/wax OH 350-D on the total heat release rate THR FIG. 9 shows the influence of combined polysiloxane modifications ML-85/wax OH 350-D and ML-85/MOS/wax OH 350-D on the average heat release rate ARHE.

FIG. 10 shows the influence of combined polysiloxane modifications ML-85/wax OH 350-D and ML-85/MOS/wax OH 350-D on the overall heat release rate THR.

FIG. 11 shows the influence of combined polysiloxane modifications ML-85/wax OH 350-D and ML-85/MOS/wax OH 350-D on the overall development of smoke TSR.

FIG. 12 shows the influence of the combined polysiloxane-modification ML-85/wax OH 350-D and ML-85/MOS/wax OH 350-D on the modification of extinction caused by smoke.

FIG. 13 shows the influence of the combined polysiloxane-modification ML-85/wax OH 350-D and ML-85/MOS/wax OH 350-D on the loss of mass.

FIG. 14 shows the maximum bending stress (in the y-direction) upon breaking the test piece of polysiloxane/phenolic resin fiberglass composites compared to the unmodified phenolic resin reference.

FIG. 15 shows the flexural modulus of polysiloxane/phenolic resin fiberglass composites compared to an unmodified phenolic resin reference.

FIG. 16 shows the water absorption at room temperature (arithmetic average from 2 determinations) of polysiloxane/phenolic resin fiberglass composites compared to an unmodified phenolic resin reference.

One essential aspect of the invention is reaction control, for the inventors found that the incorporation of prefabricated polysiloxane nanoparticles, e.g. of the kind in WO 2010/142769 A1, is unsuitable for manufacturing desirable resins and composites in resol-type phenolic resins as it leads to a very uneven distribution of particles in the polymer matrix and, thus, to purely visually unsightly composites.

Accordingly, the invention provides resol resins that are intrinsically modified with organically-modified polysiloxanes. Said polysiloxanes contain non-substituted or, in specific embodiments, substituted hydrocarbon groups, and in this case, particularly fluorinated alkyl, alkenyl, aryl, arylalkyl or alkyl-aryl groups attached to silicon atoms. Substituents, if present, are selected in such a manner that they do not react with OH groups of aromatic alcohols, with aldehydes or with hydroxy or ether groups of resoles. Therefore, they preferably do not comprise groups containing oxygen, sulfur, nitrogen, phosphor, and said polysiloxanes are non-covalently incorporated into the resol matrix.

Said polysiloxanes are selected in a specific embodiment such that if they were to be manufactured from the same raw materials, but free from aromatic alcohol and aldehyde, they would arise in the form of particles having a contact angle with respect to water of at least approx. 100°, more preferably of at least 110°, still more preferably of at least 120°, and in specific cases of at least 135° or even greater. The latter is called superhydrophobic. They are achieved particularly when said polysiloxane contains fluorinated hydrocarbon groups. WO 2010/142769 A1 can again be referred to in this regard. The use of particularly hydrophobic polysiloxanes results in the minimization of water absorption in the case of contact with water or storage.

In another preferred embodiment, more than one hydrocarbon group is attached to at least 40 percent, preferably to more than 60 percent, and particularly preferably to more than 80 percent of said silicon atoms. Said embodiment leads to a substantial share of an aliphatic polysiloxane. In a likewise preferred embodiment independent thereof, said polysiloxanes contain an average of no more than 3, more preferably no more than 2, and particularly preferably no more than 1.6 carbon atoms per silicon atom. Said embodiment is particularly distinguished by the particularly positive flame resistance of the hardened products. Both latter embodiments can potentially be combined.

With respect to the raw materials for the siloxane components of the product, in principle all silazanes with the unit —Si(R)($R^1$)—$NR^2$— or all silanes with the formula $R'_aSiX_{4-a}$ are suitable, wherein, in the case of variously structured silazanes with multiple varying units —Si(R)($R^1$)—$NR^2$—, R and $R^1$ may be respectively equal or different in the various units as well as in one and the same unit and stand for a non-substituted or, as defined above, substituted alkyl, alkenyl, aryl, arylalkyl, alkyl-aryl or hydrogen, $R^2$ is preferably hydrogen, but can also be alkyl, R' is equal or different and is a non-substituted or, as defined above, substituted alkyl, alkenyl, aryl, arylalkyl, alkyl-aryl, X is a group that can be hydrolytically condensed by silicon under hydrolysis conditions forming an Si—O—Si group, e.g. acyloxy, alkyl carbonyl, alkoxycarbonyl or $NR^3$ with $R^3$ equal to hydrogen, alkyl (preferably with 1 to 4 carbon atoms) or aryl, although particularly an alkoxy group with preferably 1 to 6, particularly preferably 1 or 2 carbon atoms, or is OH, and a is 1 or 2. If necessary, additional silanes may be inserted into the above formula with a equal to 0 and/or with a equal to 3. Particular consideration should be given to the raw materials specified in WO 2010/142769 A1 for the manufacturing of polysiloxane particles. Worthy of mention is the fact that mixtures consisting of silazanes and silanes may naturally also be used.

Examples of silazanes are: polysilazanes or mixtures of polysilazanes that bear 40 to 100% of the units —Si(R)($R^1$)—NH, wherein R and $R^1$ is an alkyl group or alkenyl group with 1 up to 7 carbon atoms, and bear 0 to 40% of the units —Si(R)($R^1$)—NH—, wherein R and alkyl group or alkenyl group with 1 to 4 carbon atoms and $R^1$ stands for hydrogen. Particularly preferred are silazanes with 40%, still more preferably with 60% and above, and particularly preferably 80% and above of the units —Si(R)($R^1$)—$NR^2$—, wherein both groups, R und $R^1$, represent methyl groups or a group represents a methyl group and said other group is a $C_1$-$C_3$ alkyl or alkenyl group, particularly either a vinyl group or likewise a methyl group, in combination with no more than 60%, preferably no more than 40%, and particularly preferably no more than 20% of the units, in which one of the two mentioned groups is hydrogen and the other is selected in such a manner that aforementioned atom ratios are complied with.

Specific examples are vinylmethylpolysilazanes or a polysilazanes from a mixture comprised of dimethylsilazane and methylsilazane units, e.g. in a molar ratio of 85 to 15.

Examples of silanes are: silanes of the formula $R'_aSiX_{4-a}$, wherein R' is an alkyl or alkenyl with 1 to 12 and a is 1, wherein X in all instances, as is defined above for silanes and is preferably alkoxy with 1 to 4 carbon atoms, particularly methoxy or ethoxy. Particularly preferred are silanes of the formula $R'_aSiX_{4-a}$ with a equal to 2 inserted, wherein a group R' is equal to alkyl (e.g. methyl) or alkenyl (e.g. vinyl) and the second group R' is alkyl (e.g. methyl or ethyl) (all mentioned groups R' with preferably 1-12, more preferably 1-6 carbon atoms). The groups R' may be equal or different.

Specific examples are vinylmethyldimethoxysilane or a mixture comprised of dimethyldimethoxysilane and methyltrimethoxysilane, e.g. in a molar ratio of 85 to 15.

The polysiloxane-modified resol resin systems according to the invention can be manufactured through the dissolution of respectively substituted silazanes, cyclical or open-chain polysilazanes, silanes, oligomeric siloxanes, mixtures of such (poly)silazanes or silanes/oligomeric siloxanes or mixtures of (poly)silazanes with silanes/oligomeric siloxanes and simultaneous reaction together with phenols and aldehydes in an alkaline medium.

Choosing aromatic alcohols and aldehydes capable of being used as the raw material is not critical. In principle, any mono or multifunctional phenol ($C_6R^1$-$R^5$)OH with the substituents $R^1$, $R^2$, $R^3$, $R^4$ and $R^5$ can be used, wherein $R^1$ to $R^5$, independent from each other, is hydrogen, hydroxy, $C_1$-$C_{10}$-alkyl, $C_1$-$C_{10}$-alkylen, $C_3$-$C_8$-cycloalkyl, $C_3$-$C_8$-cycloalkoxy, $C_1$-$C_{10}$-alkoxy, halogen (F, Cl, Br or I), phenyl, phenoxy or phenoxyphenyl and/or two of the groups $R^1$ to $R^5$ may form a condensed bond with two or more carbon atoms of the phenol ring, and wherein said alkyl, alkenyl and/or aryl groups are preferably non-substituted, but instead may also be fluorinated or partially fluorinated. Examples are phenol, 3-methylphenol, resorcinol, 2,2-(bis-4-hydroxyphenyl)-propane, tris-(4-hydroxyphenyl)-methane and 1,2-bis-(2,4,6-trihydroxyphenyl)-ethane. A phenol or a mixture consisting of multiple phenols may be used. Comparable condensed compounds may also be used as raw material.

Likewise, any mono or multifunctional aldehyde R—CHO may be used, wherein R is hydrogen, formyl, $C_1$-$C_{10}$-alkyl, $C_1$-$C_{10}$-formylalkyl, $C_3$-$C_8$-cycloalkyl, $C_3$-$C_8$-formylcycloalkyl, $C_1$-$C_{10}$-halogenalkyl (F, Cl, Br or I), phenyl or formylphenyl, and wherein alkyl or aryl groups are preferably non-substituted, though if necessary, may be fluorinated or partially fluorinated. Examples are formaldehyde, acetaldehyde, succinaldehyde, 4,4-(bis-formyl)-diphenylether and tris-(4-formylphenyl)-methane. Again, one or more aldehydes may be used.

According to the invention, the raw material for the polysiloxane share of said resin (a polysilazanes or polysilazane mixture and/or a silane or a silane mixture) as well as aromatic alcohol, or a mixture of such alcohols are provided in a suitable, preferably non-aqueous solvent (e.g. in an alcohol like isopropanol) and, if necessary, heated to reflux while stirring. Shortly after or simultaneous to dispensing a catalytically effective amount of a basic additive, e.g. of a small amount of a heavy aqueous base, such as sodium or potassium hydroxide, if necessary, an anhydrous base instead, aldehyde is added, wherein at least at this point, if the aldehyde is formaldehyde, under the usual conditions water is also added to the system. In the process, said aldehyde is normally used in molar excess (molar ratio alcohol/aldehyde generally between 1:1.05 and 1:3.5). The polysiloxane/silazane share in said resol resin compound is favorably 5 to 50% by mass; depending on the desired properties of the final product. After an additional reaction time of typically several hours, the obtained clear polysiloxane/resol resin solution or emulsion, if necessary, is concentrated to a viscosity optimal for the following impregnation.

A phenol is preferably used as an aromatic alcohol.

If the resol-modified polysiloxane obtained in this manner needs to be hardened to a moulded article, the solvent is removed from the mixture, whereupon the mass, potentially at an elevated temperature, is placed in a suitable moulded article and hardened. Polysiloxane/resol resin systems, however, are preferably used as an impregnation agent, coating composition or impregnating resin. For this purpose, the viscosity of the solution is adjusted by dilution or concentration such that a substrate can be easily impregnated (e.g. from or with glass, carbon and/or natural fibers). In this case, the total resin share is typically in the range of 10 to 60% by mass, preferably in the range of 20 to 40% by mass, and for example, at approx. 30% by mass. Through subsequent pressing and simultaneous tempering (typically 5 bar, 30 minutes at 16° C.) polysiloxane/resol resin (and especially polysiloxane/phenol resin) composites are obtained with a homogeneous distribution of the polysiloxane component. Likewise, production of polysiloxane/resol resin moulded articles that do not contain fiber fillers is possible.

The hardened resin in the form of a moulded article as well as with the resin-impregnated substrate demonstrates a significant improvement in flame resistance and flexural strength as well as reduced water absorption compared to a polysiloxane-free reference system.

If necessary, one or more additional additives, such as dyes, pigments, etc. may be added to said resin solution or the solvent released from the resin. A further improvement of relevant parameters can surprisingly be achieved through additional doses of waxes, in particular on the basis of polysiloxane, to the polysiloxane-modified resol resin solutions accumulated through the preparation. Based on the overall system, 1-25% by mass can be advantageously used. As an example, the commercially available wax, OH 350-D manufactured by Wacker Chemie AG, can be mentioned, for which an ABA block copolymer with polycaprolactone is involved.

In contrast, merely adding such a wax without the organically-modified polysiloxane as stipulated by the invention is not sufficient to achieve the desired high level of mechanical properties—at least in higher fill levels, the storage module is reduced through a softener effect.

The invention can be explained in greater detailed based on the following examples.

EXAMPLE 1

In a 2 liter, four-necked flask equipped with overhead stirrer, reflux condenser, 5 ml and 500 ml dropping funnels, and heating bath, 56.2 g of a polysilazane with about 85 mol % of units of composition —[Si($CH_3$)NH]— and approx. 15 mol % of units from the composition —[Si(H)($CH_3$)—NH]— (ML-85 Clariant GmbH Germany) and 183.4 g of phenol is provided to 500 ml of isopropanol and heated to reflux while stirring. Subsequently, 3.46 g 50% by mass of a sodium hydroxide solution and then 237.3 g of a 37% by mass of an aqueous formaldehyde solution is added within approx. 10 minutes. Ammonia and hydrogen begin to form. The mixture is stirred for another 3 hours under reflux, then cooled to room temperature and neutralized with glacial acetic acid against phenolphthalein. Finally, the solvent mixture is distilled off on a rotary evaporator at T=60° C. and p=100 mPa to an optimal viscosity for the subsequent impregnation. The polysiloxane content in the resol resin is approx. 21% by mass.

Designation of the method name: ML-85

EXAMPLE 2

Example 1 is repeated with the modification that after the end of the reaction 14.2 g (5% by mass) of polysiloxane wax OH 350-D (Wacker Chemie AG) are added to the isopropanol solution of polysiloxane-modified resol resin. The polysiloxane resin share is then a total of 25% by mass.

Designation of the method: ML-85/wax

EXAMPLE 3

Example 1 is repeated with the modification that 87.2 g of vinylmethyldimethoxysilane (ABCR GmbH) is added instead of polysilazane ML-85.

Designation of the method: VL-100/MOS

EXAMPLE 4

Example 1 is repeated with the modification that 52.2 g (59 mol %) of dimethyldimethoxysilane and 41.1 g (41 mol %) of methyltrimethoxysilane (both ABCR GmbH) is added instead of polysilazane ML-85.

Designation of the method: ML-59/MOS

EXAMPLE 5

Example 1 is repeated with the modification that 86.2 g (85 mol %) of dimethyldimethoxysilane and 17.2 g (15 mol %) of methyltrimethoxysilane (both ABCR GmbH) is added instead of polysilazane ML-85.

Designation of the method: ML-85/MOS

EXAMPLE 6

Example 5 is repeated with the modification that after the end of the reaction 14.2 g (5% by mass) of polysiloxane wax OH 350-D (Wacker Chemie AG) is added to the isopropanol solution of the polysiloxane-modified resol resin. The polysiloxane share in the resin is then a total of 25% by mass.

Designation of the method: ML-85/MOS/wax

EXAMPLE 7

Comparative Example

Example 1 is repeated with the modification that no polysilazanes or silanes are added and after the end of the reaction 11.9 g (5% by mass) of polysiloxane wax OH 350-D (Wacker Chemie AG) are added to the isopropanol solution of the unmodified resol resin.

Designation of the method: Wax

EXAMPLE 8

Comparative Example

Example 1 is repeated with the modification that no polysilazanes, silanes or polysiloxane wax OH 350-D are added.

Designation of the method: Reference

Any substrate, as described above, can be coated or impregnated with the aforementioned resol solutions. As an example, studies of glass fiber composite laminates are presented in the following.

To manufacture the composite laminates, first, 4 layers of glass fibers of the type, Atlas (PD Interglas Technologies AG), having a basis weight of 296 g/m$^2$ were impregnated with the resol resin solution accumulated in accordance with Examples 1-8. Through a subsequent 7.5 minute tempering at 12° C. the remaining solvent mixture was removed and a preliminary cross-linking of the resins was performed. The resulting prepreg was hardened in a laboratory press VKE (Lauffer GmbH & Co. KG) for 30 minutes at 160° C. under a pressure of 5 bar. Polysiloxane/phenolic resin glass fiber compounds or the unmodified reference compound having a thickness of 0.85 mm and a total resin share of 30% by mass were obtained.

To determine the flame resistance of the composite laminates, a cone calorimeter (Fire Testing Technology Ltd.; UK) was used at a heat flux of 50 kW/m$^2$. The test pieces each had typical dimensions of L*W*H of 100*100*0.85 mm$^3$ with a mass of approx. 16 g.

To determine the maximum bending stress of the composite laminates upon breaking the sample and, thus, the tensile strength as well as the flexural modulus (three-point bending test), the Instron 3369 (Instron Germany GmbH) testing device was used with a maximum bending force of 13-15 kN with the test speed 10 mm/min. Measurements were made on five samples with typical dimensions of L*W*H=80*10*0.85 mm$^3$ and a mass of about 1.2 g.

To determine the water absorption of the composite laminates at room temperature, the test pieces (L*B*H=80*10*0.85 mm$^3$, respectively 2 comparison samples) were transferred to a beaker filled with distilled water and weight gain after defined periods of storage was determined through the use of a analytical scale determined.

Studies of fire behavior on the polysiloxane-modified phenolic resin fiberglass composites (heat flux 50 kW/m$^2$) revealed that the maximum heat release rate (HRR), particularly in samples ML-85, ML-5/MOS/wax and ML-85/wax with 43.71 or 83 kW/m$^2$ is significantly reduced compared to the unmodified phenolic resin (153 kW/m$^2$). The modified composites VL-100/MOS and ML-59/MOS (HRR 117 or 112 kW/m$^2$) also demonstrate a positive effect—albeit only moderately strong. The total heat release during extinction (THR) for all composite laminates with 1.8 MJ/m$^2$ (ML-85/wax) to 3.3 MJ/m$^2$ (reference/wax) is far below the value for the unmodified resin (5.2 MJ/m$^2$). Accordingly, the maximum average rate of heat emission MARHE are 21 kW/m$^2$ (ML-85) to 38 kW/m$^2$ (VL-100/MOS) vs. 53 kW/m$^2$ (reference).

In summary, we can say that the polysiloxane fiberglass composites with ML-85/wax ML-85/MOS/wax demonstrate the best flame resistance, as the additional filling with 5% by mass of polysiloxane wax OH 350-D leads to a very heavy reduction of smoke development TSR (for example 2.7 m$^2$/m$^2$; ML-85/wax to 6.7 m$^2$/m$^2$, ML-85). FIGS. 1-13 reveal the individual findings for the relevant parameters. Furthermore, in this case the numerical values behind the sample numbers reveal the total resin content (resin plus polysiloxane) in the composite Ma. %. Table 1 summarizes the results.

Compared to the unmodified reference in almost all modifications, the studies using a 3-point bending test demonstrated very clearly pronounced increase of maximum bending stress and, thus, the flexural breaking strength (with the exception of polysiloxane modification ML-59/MOS). The systems with each 20/5% by mass ML-85/wax and ML-85/MOS/wax achieved the best results (see FIG. 14). This finding is also carried over to the improvement of the values of the E-(bending) module in FIG. 15.

Although all resol resin fiberglass compounds demonstrate a very low absorption of water after 13 days of storage time in water at room temperature with H$_2$O shares of significantly below 4% by mass, we can determine that the modification with polysiloxanes prepared from polysilazanes as well as silanes leads to an additional reduction of the water content compared to the unmodified phenolic resin system. In contrast, the exclusive modification with wax containing polysiloxane OH 350-D does not affect any significant effect (see FIG. 16).

Overall, the resol resin-fiberglass compounds demonstrate the best results with respectively 20/5% by mass of combined polysiloxane-modification ML-85/wax OH 350-D and ML-85/MOS/wax OH 350-D.

TABLE 1

Summary of relevant parameters for the fire behavior of polysiloxane/phenol resin - fiberglass compounds

| Sample; Total resin content | HRR-Peak [kW/m$^2$] | MARHE [kW/m$^2$] | THR [MJ/m$^2$] | THR (End) [MJ/m$^2$] | TSR [m$^2$/m$^2$] | CR [%] | CR (End) [%] |
| --- | --- | --- | --- | --- | --- | --- | --- |
| VL-100/MOS; 29.4% | 117 | 38 | 3.1 | 9.4 | 164 | 89 | 77 |
| ML-85; 31.6% | 43 | 21 | 2.1 | 6.7 | 158 | 92 | 82 |
| ML-85/MOS; 29.7% | 97 | 30 | 2.9 | 4.2 | 96 | 91 | 84 |
| ML-59/MOS; 29.6% | 112 | 27 | 2.1 | 5.6 | 198 | 92 | 88 |
| ML-85/Wax; 30.3% | 83 | 28 | 1.8 | 2.7 | 90 | 92 | 89 |
| ML-85/MOS/Wax; 32.2% | 71 | 28 | 2.6 | 4.0 | 53 | 90 | 86 |
| Reference/Wax; 29.6% | 97 | 32 | 3.3 | 5.4 | 73 | 85 | 79 |
| Reference; 31.3% | 153 | 53 | 5.2 | 7.3 | 232 | 86 | 77 |

What is claimed is:

1. A resol resin comprising at least one aromatic component with at least one phenolic hydroxyl group and at least one aldehyde component, wherein areas embedded in the resol resin matrix comprise organically-modified polysiloxane, with said polysiloxane containing hydrocarbon groups that are at least partially bonded to silicon atoms in the form of non-substituted or substituted alkyl, alkenyl, aryl, arylalkyl or alkyl-aryl groups and that are not linked by covalent bonds to reactive groups of said resol resin, wherein more than one hydrocarbon group is bonded to at least 40 percent of the silicon atoms of said polysiloxane, wherein said resol resin further comprises at least one additive that influences the color or the mechanical properties or the flame-resistance of a product manufactured from it, and wherein said additive is a wax.

2. Resol resin according to claim 1, wherein said polysiloxanes have an average of no more than 3 carbon atoms per silicon atom.

3. Resol resin according to claim 1, wherein more than one hydrocarbon group is bonded to more than 60 percent of the silicon atoms of said polysiloxane.

4. Resol resin according to claim 1, in which said alkyl, alkenyl, aryl, arylalkyl, and/or alkyl-aryl groups of said polysiloxane are non-substituted or partially or completely fluorinated.

5. Resol resin according to claim 1, wherein said aromatic component with at least one phenolic hydroxy group is selected from phenol, 3-methylphenol, resorcinol, 2,2-(bis-4-hydroxyphenyl)-propane, tris-(4-hydroxyphenyl)-methane, 1,2-bis(2,4,6-trihydroxyphenyl)-ethane and mixtures thereof, and/or wherein said aldehyde component is selected from formaldehyde, acetaldehyde, succinaldehyde, 4,4'-(bis-formyl)-diphenyl ether, tris-(4-formylphenyl)-methane, and mixtures thereof.

6. A moulded article including a phenoplast material, prepared by hardening the resol resin according to claim 1.

7. A moulded article according to claim 6 comprising a substrate material as well as a hardened resol resin located on its surface.

8. A method for producing a phenolic resin moulded article according to claim 7, wherein
(1) (a) a silazane or a mixture of various silazanes with one or more units —[Si(R)(R$^1$)—NR$^2$]—, in which R and R$^1$ each are equal or different in each individual unit, and if different units exist, in different units and have the meaning of a non-substituted or substituted alkyl, alkenyl, aryl, arylalkyl, alkyl-aryl or hydrogen, and in which R$^2$ is hydrogen or alkyl, and/or (b) a silane or a mixture of various silanes with the formula R'$_a$SiX$_{4-a}$, in which R' is equal or different and is a non-substituted or substituted alkyl, alkenyl, aryl, arylalkyl or alkyl-aryl, and in which X is a hydrolytically condensable group that forms a Si—O—Si group under conditions of hydrolysis from silicon or is an OH group and a means 1 or 2, or an oligosiloxane obtainable through hydrolytic condensation of said silane/silanes, or a mixture of such oligosiloxanes, and
(2) an aromatic component with at least one phenolic hydroxyl group are provided in a solvent and, in a single step, are converted
(3) with an aqueous alkaline medium or a non-aqueous base as well as water and
(4) with an aldehyde component;
the resulting solution is adjusted to a suitable viscosity optionally by adding or removing solvent, applied to a substrate, and finally cured through the effect of temperature and, optionally, pressure.

9. A method according to claim 8, wherein the substrate is a textile sheet material, which is impregnated with the resulting solution.

10. A method according to claim 9, wherein said textile sheet material contains or consists of glass fibers, carbon fibers, and/or natural fibers.

11. A method for producing a phenolic resin moulded article according to claim 6, wherein
(1) (a) a silazane or a mixture of various silazanes with one or more units —[Si(R)(R$^1$)—NR$^2$]—, in which R and R$^1$ each are equal or different in each individual unit, and if different units exist, in different units and have the meaning of a non-substituted or substituted alkyl, alkenyl, aryl, arylalkyl, alkyl-aryl or hydrogen, and in which R$^2$ is hydrogen or alkyl, and/or (b) a silane or a mixture of various silanes with the formula R'$_a$SiX$_{4-a}$, in which R' is equal or different and is a non-substituted or substituted alkyl, alkenyl, aryl, arylalkyl or alkyl-aryl, and in which X is a hydrolytically condensable group that forms a Si—O—Si group, under conditions of hydrolysis from silicon or is an OH group and a means 1 or 2, or an oligosiloxane obtainable through hydrolytic condensation of said silane/silanes, or a mixture of such oligosiloxanes, and
(2) an aromatic component with at least one phenolic hydroxyl group are provided in a solvent and, in a single step, are converted
(3) with an aqueous alkaline medium or a non-aqueous base as well as water and
(4) with an aldehyde component,
whereupon said solvent is removed and a resulting resin is cured through the effect of temperature.

12. A method for producing a resol resin according to claim 1, wherein
(1) (a) a silazane or a mixture of various silazanes with one or more units —[Si(R)(R$^1$)—NR$^2$]—, in which R and R$^1$ each are equal or different in each individual unit, and if different units exist, in different units and have the meaning of a non-substituted or substituted alkyl, alkenyl, aryl, arylalkyl, alkyl-aryl or hydrogen, and in which R$^2$ is hydrogen or alkyl, and/or (b) a silane or a mixture of various silanes with the formula R'$_a$SiX$_{4-a}$, in which R' is equal or different and is a non-substituted or substituted alkyl, alkenyl, aryl, arylalkyl or alkyl-aryl, and in which X is a hydrolytically condensable group that forms a Si—O—Si group under conditions of hydrolysis from silicon, or is an OH group and a means 1 or 2, or an oligosiloxane obtainable through hydrolytic condensation of said silane/silanes, or a mixture of such oligosiloxanes, and
(2) an aromatic component with at least one phenolic hydroxyl group is provided in a solvent, and are reacted in said solvent
(3) with an aqueous alkaline medium or a non-aqueous base and water as a catalyst and
(4) with an aldehyde component and wherein after completion of the reaction, a wax is added to said polysiloxane-modified resol resin.

13. A method according to claim 12, wherein the solvent is a non-aqueous solvent.

14. A method according to claim 12, in which the aqueous alkaline medium is selected from aqueous sodium and potassium hydroxide with a pH value of at least 13.

15. A method according to claim 12, wherein the addition of said aqueous alkaline medium or the non-aqueous base and water is made directly prior to or simultaneously with the addition of said aldehyde component.

16. A method according to claim 12, wherein the molar relation of said aromatic component with at least one phenol hydroxyl group to said aldehyde component is between 1:1.05 and 1:3.5.

17. A method according to claim 12, wherein said aromatic component with at least one phenolic hydroxyl group is a phenol.

* * * * *